March 12, 1963  J. MARLEY  3,081,420
DEFLECTION YOKE

Filed Feb. 11, 1960  3 Sheets-Sheet 1

March 12, 1963     J. MARLEY     3,081,420
DEFLECTION YOKE

Filed Feb. 11, 1960     3 Sheets-Sheet 2

United States Patent Office 3,081,420
Patented Mar. 12, 1963

3,081,420
DEFLECTION YOKE
John Marley, West Caldwell, N.J., assignor to Hazeltine Research, Inc., a corporation of Illinois
Filed Feb. 11, 1960, Ser. No. 8,072
9 Claims. (Cl. 317—200)

This invention relates to deflection yokes for cathode-ray tubes and, while not restricted thereto, is particularly useful in connection with multi-gun cathode-ray tubes of the type used in color-television receivers.

Multi-gun cathode-ray tubes of the type used in color-television receivers for reproducing the color image are characterized by having three electron guns, one for each of the primary colors, which are mechanically positioned to cause the corresponding electron beams to converge at the center of the display screen. The display screen surface is covered with the three primary color phosphors arranged in a desired pattern. A color-control structure is positioned a short distance behind the phosphor layer for directing the individual beams to their respective color phosphors. In order that the phosphor elements excited by the three beams for a given image point may appear to the human eye to blend together to give a spot of a single color, it is necessary that the three beams converge at the surface of this control structure so as to pass through the same aperture in the control structure. It is known, however, that the fact that some of the beams are incident into the main deflection field at different angles causes these beams to be deflected differently by the main deflection field. Because they are deflected differently, that is, by different amounts, the three beams will converge at points different from the surface of the color-control structure and, hence, pass through different apertures in such structure. This causes a noticeable separation of the resulting color spots, which separation is commonly referred to as "dynamic misconvergence." The magnitude of this misconvergence depends on the amount of deflection that is being experienced, the greater the deflection, the greater the misconvergence.

It has been proposed to overcome this misconvergence of the three beams in a three-gun color tube by use of so-called "dynamic convergence circuits." In this case, there are special circuits each having corresponding pole pieces and coil windings for developing auxiliary magnetic fields which individually operate on different ones of the electron beams before they reach the main deflection field to give a sufficient additional deflection such that all three beams will pass through the same aperture in the color-control structure. Because of the fact that the degree of misconvergence varies with the amount of deflection, the strength of these auxiliary fields must also vary with the amount of deflection. As is known, the desired field variations may be obtained by supplying to each dynamic convergence coil a complex current wave form which takes the form of horizontal (line scan) frequency parabolas superimposed on vertical (field scan) frequency parabolas. Such a wave form is usually developed by obtaining signals from each of the vertical and horizontal deflection circuits, shaping these signals, and then combining them in a tuned resonant circuit. Though usually not utilizing any tubes, such circuits are relatively complex in nature and generally have an undesirably large number of adjustable controls. This large number of controls makes the adjustment of the dynamic convergence a relatively complex matter. Also, because the dynamic convergence wave forms are derived from signals from the vertical and horizontal deflection circuits, such wave forms tend to be sensitive to, and to vary with, the supply voltages and circuit constants of the vertical and horizontal deflection circuits.

A problem which is substantially the same as the misconvergence of the three electron beams in a color tube may also be experienced in a single-gun tube, such as a black-and-white cathode-ray tube. This problem occurs in such single-gun tubes for certain cases where the different electrons are incident into the main deflection field at different angles, and, hence, are deflected differently. The end result is that the beam is misconverged or distorted at the display screen, the amount of misconvergence depending on the magnitude of the deflection.

It is an object of the invention, therefore, to provide a new and improved deflection yoke for use with cathode-ray tubes for minimizing dynamic misconvergence.

It is another object of the invention to provide a new and improved deflection yoke for multi-beam cathode-ray tubes which eliminates the need for either some or all of the dynamic convergence circuits heretofore utilized.

It is a further object of the invention to provide a new and improved deflection yoke which may, depending on the circumstances, be useful with single-gun cathode-ray tubes for improving the convergence of the electron beam as it is deflected from side to side.

In accordance with the invention, a deflection yoke for use with cathode-ray tubes for minimizing dynamic misconvergence comprises a hollow yoke core having a transverse cylindrical contour at at least one end thereof and a yoke coil positioned within the core and having conductors shaped to follow the contours of the core, so that in operation a concave magnetic field boundary is developed.

For a better understanding of the present invention, together with other and further objects thereof, reference is had to the following description, taken in connection with the accompanying drawings, and its scope will be pointed out in the appended claims.

Referring to the drawings.

Figure 1:
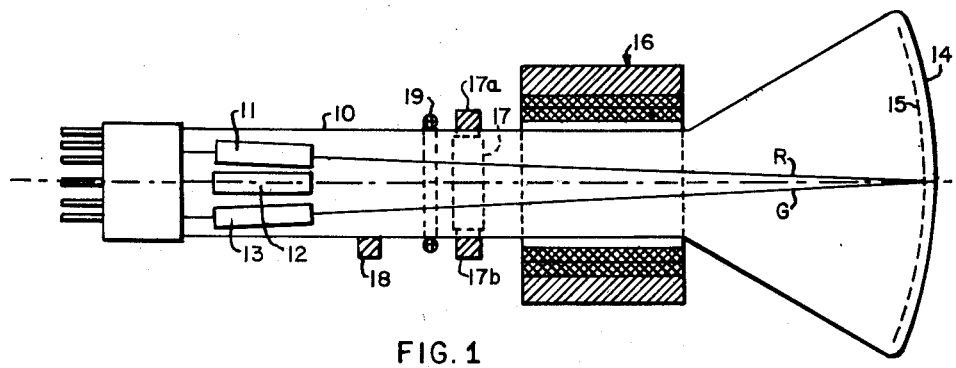
FIG. 1 is a cross-sectional view of a representative three-gun color cathode-ray tube.

*Description and Operation of the FIG. 1 Arrangement*

Referring to FIG. 1 of the drawings, there is shown a cross-sectional view of a representative three-gun color cathode-ray tube 10. The cathode-ray tube 10 includes a red electron gun 11, a blue electron gun 12, and a green electron gun 13, each of which serves to produce a narrow stream of electrons which is directed towards the display screen structure at the other end of the tube, the three guns being arranged one beside the other as indicated in the drawing. The three guns are usually mechanically positioned so that the three electron beams more or less converge at the center of the display screen, that is, the two outside guns are usually toed-in toward the center of the phosphor screen, no toeing in of the middle gun 12 being required because it is already on the center axis. The display screen structure comprises a phosphor screen 14 which is usually the front end of the glass envelope of the tube 10 on the inner surface of which are deposited the three color phosphors in a desired pattern. The display screen structure also includes a color-control structure 15 positioned a short distance behind the phosphor screen 14. The color-control structure 15 may, for example, take the form of either a shadow mask or a focus grille. By "shadow mask" is meant a structure which, due to the angle of incidence of the beams, serves to direct each beam to its corresponding color phosphor, while "focus grille" denotes a structure which serves to produce between such grille and the phosphor screen 14 an electric field which is suitable for directing the beams to their respective color phosphors.

Disposed around the neck of the cathode-ray tube 10 is a deflection yoke 16 for producing the appropriate deflection fields for deflecting the electron beams back and forth across the phosphor screen 10 so as to develop the usual raster pattern. In accordance with the present invention, the internal construction of this deflection yoke 16 may be modified to avoid either some or all dynamic misconvergence of the three electron beams as they scan from side to side. Also disposed around the neck of the cathode-ray tube 10 is a permanent magnet assembly 17, two magnets of which are indicated by the magnets 17a and 17b of FIG. 1. Each magnet may be designed to cooperate with internal pole pieces to develop a magnetic field which operates on a corresponding electron beam to provide movement of the beam in a radial direction. Another permanent magnet 18 is also provided for operating on one of the beams to produce tangential movement thereof. These positioning magnets represented by the magnet assembly 17 and the magnet 18 enable the three electron beams to be accurately converged at the center of the phosphor screen 14. This is sometimes referred to as "static" convergence as the magnetic fields developed by the permanent magnets remain fixed regardless of the deflection of the beams. It is to be noted that, contrary to present practice, either no or fewer coil windings need be associated with the permanent magnet assembly 17 for producing varying magnetic fields for providing dynamic convergence, provided the principles of the present invention are utilized. In other words, the so-called static convergence is still necessary when the present invention is utilized but the need for the previously utilized form of dynamic convergence is either wholly or partly eliminated, depending on the circumstances.

There is also disposed around the neck of the cathode-ray tube 10 a purity coil 19 for developing a transverse magnetic field which may be utilized to compensate for manufacturing tolerances in the alignment of the gun structure relative to the tube axis. Also, it should be noted that the present invention is not limited to use with cathode-ray tubes having three guns or to color cathode-ray tubes having the present gun arrangement though, for sake of illustration, the present invention shall be described with reference to this environment because such multi-gun color tubes represent a common example of a situation where the teachings of the present invention may be used to great advantage.

Figure 2:
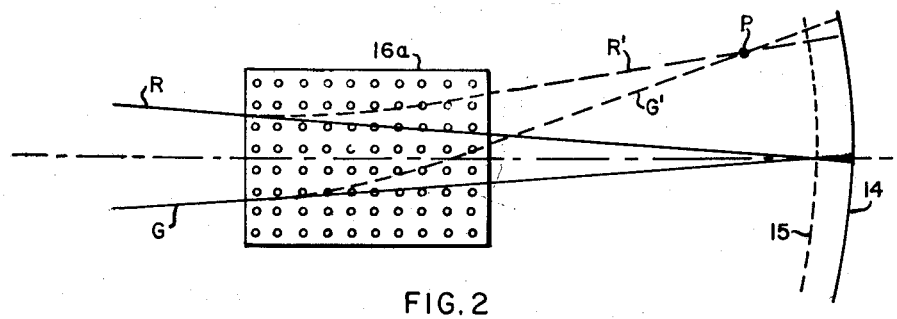
FIGS. 2 and 3 are magnetic deflection field diagrams used in explaining the present invention.
Figure 3:
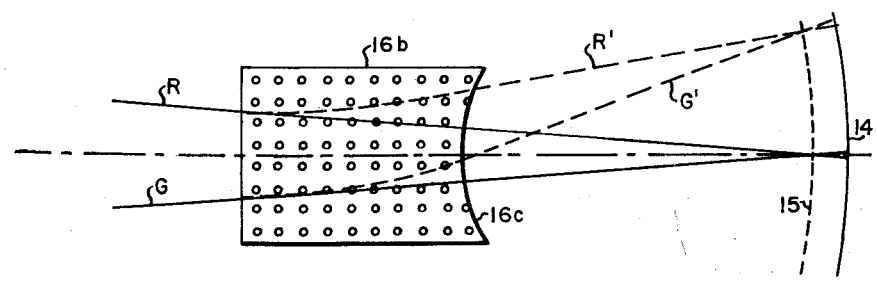

The problems overcome by the present invention and the manner in which they are overcome will now be described by means of the magnetic deflection field diagrams of FIGS. 2 and 3. Referring first to FIG. 2, there is represented a magnetic deflection field 16a corresponding to the horizontal deflection field of a conventional prior art deflection yoke positioned in the manner indicated by the deflection yoke 16 of FIG. 1. Only the horizontal deflection field, the flux lines of which are at right angles to the plane of the paper as indicated by the small o's, is shown in order to simplify the explanation. Also, for ease of understanding, only the red and green electron beams R and G are shown.

The problem with the prior art deflection field illustrated in FIG. 2 is that the different angles of incidence of the electron beams R and G cause them to be deflected by different amounts and, hence, to converge or cross over at a point P which falls short of the color-control structure 15. As a result the two beams, in this case indicated by the dotted line paths R' and G', pass through different apertures in the color-control structure 15 and, hence, excite phosphor dots, the separation of which is very noticeable to the human eye. In other words, the red and green phosphor dots are no longer superimposed as far as the eye is concerned but are separate and distinct dots, the separation being as much as one-half of an inch for the larger angles of deflection. Ideally the three beams, only two of which are illustrated in FIG. 2, should converge at the color-control structure 15 so as to pass through the same aperture in such structure 15. Because of the static convergence adjustment, this condition is made to prevail at the center of the display screen as shown by the solid line extensions of beams R and G which converge properly at the center of structure 15. As the beams are deflected away from the center of the display screen, however, the point at which they converge moves further and further back of the color-control structure 15 as the degree of deflection increases. As mentioned, this arises from the fact that the beams are incident into the main deflection field 16a at different angles. In other words, assuming a given field strength, then the radius of curvature for each beam in the magnetic field is the same but, due to the different angles of incidence, the different centers of this radius are displaced differently so that the different beams stay within the deflection field region for different lengths of time and, hence, are deflected differently, the amount of the difference increasing as the angle of deflection increases. As will be noted in FIG. 2, the green beam G stays within the deflection field 16a for a longer period of time and, hence, receives a greater amount of deflection when the beams are being deflected upwardly in the drawing.

In accordance with the present invention, this defect may be overcome by properly shaping the end boundary at the exit end of the magnetic deflection field. The ideal shaping of the end boundary is indicated in FIG. 3. As indicated by the exit boundary 16c of the magnetic deflection field 16b, the shaping should be such that this end boundary is concave in nature. As a result, the green beam G will no longer stay within the magnetic field for a longer period of time but rather will emerge at the same time as the red beam R, and hence, each will suffer the same amount of deflection. As a result, the deflected beams R' and G' will converge at the surface of the color-control structure 15 and, hence, pass through the same aperture.

In order to achieve the desired convergence it might appear that perhaps the entrance end of the deflection field should be given the desired shaping. In accordance with the present invention, this might be done. By itself, however, it would be more difficult to produce the desired results entirely in this manner without shaping the exit end of the field because, for one thing, the beams are very nearly on the axis of the tube at the entrance end and, hence, would be only slightly affected by such a field.

*Description and Operation of Deflection Yoke 16*

Figure 4A:
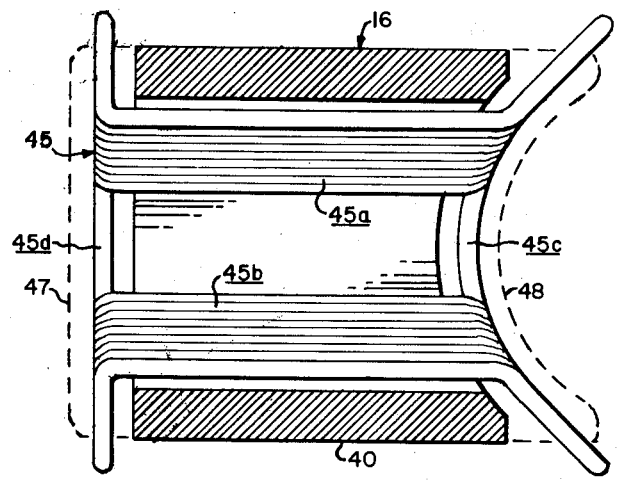
FIG. 4a is a sectional view of a deflection yoke constructed in accordance with the present invention.
Figure 4B:
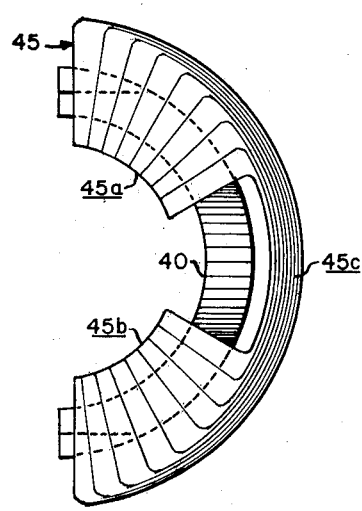
FIG. 4b is an end view of the FIG. 4a arrangement.

Referring now to FIGS. 4a and 4b there are shown sectional views of an embodiment of deflection yoke 16 for use with cathode-ray tubes for minimizing dynamic misconvergence. The view of FIG. 4a corresponds to the section shown in FIG. 1 where the schematically shown yoke 16 is sectionally divided by a horizontal plane. Thus, referring to the end view of FIG. 4b, it will be appreciated that the yoke is actually comprised of two halves identical to the half shown. For clarity, the configuration of the vertical deflection coils of the deflection yoke has been omitted from FIG. 4. The vertical deflection coils required in an actual yoke can be of standard construction of the type well known in the prior art.

Figure 5:
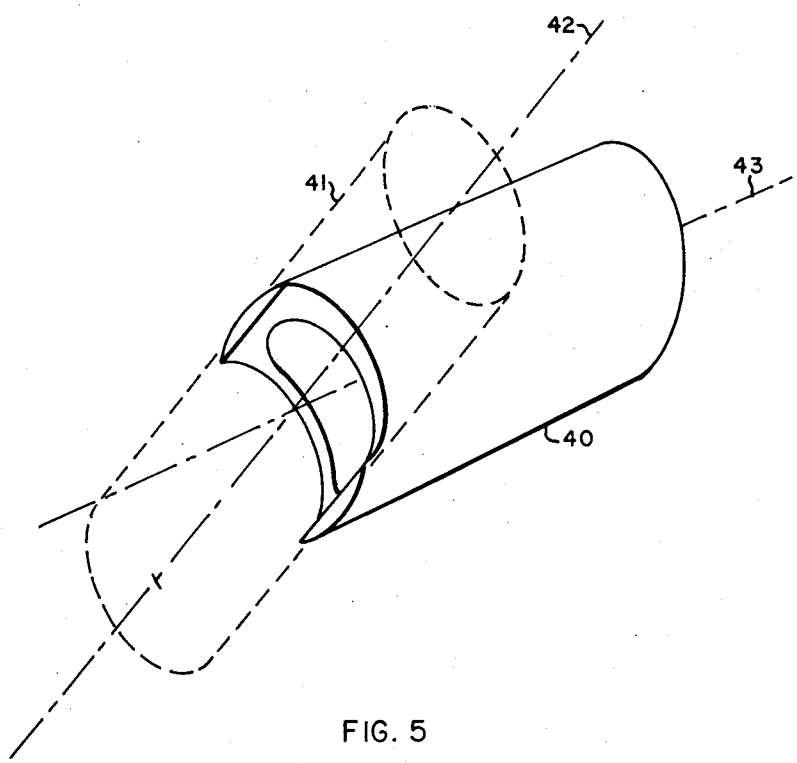
FIG. 5 is a view of a yoke core constructed in accordance with the present invention.

This yoke includes a hollow yoke core 40 having a transverse cylindrical contour at its beam exit end. The term "transverse cylindrical contour" as used in this specification refers to a contour as would result at the intersection of a given geometric shape and a portion of a cylindrical surface whose axis is transverse as compared to the axis of the intersected shape. Thus, for example, referring to the illustration of core 40 shown in FIG. 5, the left end of the hollow cylindrical core 40 has a transverse cylindrical contour which is the result of the intersection of this core with a circular cylindrical surface 41 (shown dotted) having its axis 42 perpendicular to the axis 43 of the core. (It will be seen that in this example, cylindrical surface 41 is of a smaller diameter than core 40 and the portion of the end of core 40 not intersected is shown as two flats whose surfaces are perpendicular to axis 43.) As a further definition, the contour illustrated is considered a perpendicular transverse cylindrical contour since axes 42 and 43 are perpendicular. Also, deflection of a beam coming through core 40 substantially along its axis 43 would be deflected in a direction perpendicular to the axis of the transverse cylindrical contour if it were deflected in a direction perpendicular to axis 42. The yoke illustrated is of hollow circular cylindrical form and may be constructed of ferrite material or other suitable ferromagnetic material.

The deflection yoke also includes a yoke coil 45 having longitudinal conductors 45a and 45b positioned within the core 40, and end turn conductors 45c at the beam exit end of the core shaped to follow the previously described contour of the core. This coil also includes end turn conductors 45d at the beam entrance end of the core which are shaped in known manner. Coil 45 comprises two identical sections electrically connected so that a description of the section shown applies equally to the section not shown.

In operation, signals are applied to coil 45 so that when a current flows in one direction (to the right, for example) in conductors 45a, an equal but opposite current flows in conductors 45b (to the left in this example). The result of such a current will be a magnetic field associated with the yoke 16. The boundary of this magnetic field (the area of half-power, for example) will resemble dotted line 47 at the beam entrance end of the yoke. Methods for calculating such a boundary are well known in the art. At the exit end, the described shaping of core 40 and coil 45 will cause a magnetic field boundary similar to dotted line 48. This magnetic field boundary results from the incremental differences in the lengths of conductors 45a and 45b and the contour of yoke 40. With proper design the effect of the magnetic field produced by the end turn conductors 45c and 45d is of secondary or negligible importance. Therefore, the coil 45 can be considered as including only conductors 45a and 45b and these conductors can be considered as ending where their straight line configuration ends. Thus, it will be seen that at the shaped end of the core 40, the coil 45 has a curved termination substantially complementary to the contour of core 40. When current flows through these conductors individual flux lines will have a bowed-out contour of substantially opposite curvature as compared to dotted line 48. However, the net resultant outline of all these lines will resemble dotted line 48 and the result is a yoke which produces a magnetic field substantially the same as the ideally desired field illustrated in FIG. 3.

Up to this point the present invention has been described with reference to the illustrative case of deflection in the horizontal direction. This was done by assuming that the electron guns were arrayed in a horizontal plane. It is to be clearly understood, however, that the teachings of the present invention may be utilized equally well to produce the desired convergence where the electron beams are incident into the main deflection field region in a vertical plane. Also the invention may be applied to a case where two electron beams are incident into the deflection field in the horizontal plane for example, and the third beam is displaced from the other two so as to form a triangular configuration. In such a case dynamic convergence circuits would be required only for the one beam which is displaced.

In retrospect, it will be seen that the technique of the present invention shifts the matter of convergence correction from a circuit complexity to an internal complexity in the deflection yoke. There are, however, several reasons which indicate that this shift is a decidedly desirable one. As mentioned, the dynamic convergence circuits heretofore utilized are characterized by having a multitude of adjustable controls. In accordance with the present invention, however, there are no adjustable controls as the correction factors have been properly built into the yoke in a permanent manner. Also important is the fact that the modification required of the yoke is one that may be relatively easily obtained. In other words, there is substantially no greater difficulty in winding the coil shapes and forming the core necessary for practicing the present invention, than there is in making coils or cores of a conventional shape.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A deflection yoke for use with cathode-ray tubes for minimizing dynamic misconvergence, the yoke comprising: a hollow yoke core having a transverse cylindrical contour at at least one end thereof; and a yoke coil positioned within the core and having conductors shaped to follow said contours of the core, so that in operation a concave magnetic field boundary is developed.

2. A deflection yoke for use with cathode-ray tubes for minimizing dynamic misconvergence, the yoke comprising: a hollow yoke core having a transverse cylindrical contour at at least one end thereof; and a yoke coil positioned within the core and having conductors shaped to follow said contours of the core, so that in operation a cylindrical magnetic field boundary is developed.

3. A deflection yoke for use with multi-beam cathode-ray tubes for minimizing dynamic misconvergence, the yoke comprising: a hollow yoke core having a transverse cylindrical contour at the beam exit end thereof; and a yoke coil having longitudinal conductors positioned within the core and end turn conductors at the exit end shaped to follow said contour of the core, so that in operation a concave magnetic field boundary is developed at the exit end of the core.

4. A deflection yoke for use with multi-beam cathode-ray tubes for minimizing dynamic misconvergence, the yoke comprising: a hollow yoke core having a transverse cylindrical contour at the beam exit end thereof; and a yoke coil having longitudinal conductors positioned within the core and end turn conductors at the exit end shaped to follow said contour of the core, so that in operation a concave cylindrical magnetic field boundary is developed at the exit end of the core.

5. A deflection yoke for use with cathode-ray tubes comprising: a hollow yoke core having a transverse cylindrical contour at at least one end thereof; and a yoke coil positioned within the core and having conductors shaped to follow said contours of the core, so that in operation the magnetic field developed is effective to minimize dynamic misconvergence caused by beam deflection in a direction perpendicular to the axis of the transverse cylindrical contour.

6. A deflection yoke for use with multi-beam cathode-ray tubes comprising: a hollow yoke core having a transverse cylindrical contour at the beam exit end thereof; and a yoke coil having longitudinal conductors positioned within the core and end turn conductors at the exit end shaped to follow said contour of the core, so that in operation the magnetic field developed is effective to minimize dynamic misconvergence caused by beam deflection in a direction perpendicular to the axis of the transverse cylindrical contour.

7. A deflection yoke for use with multi-beam cathode-ray tubes for minimizing dynamic misconvergence, the yoke comprising: a hollow yoke core having a perpendicular transverse cylindrical contour at the beam exit end thereof; and a yoke coil having longitudinal conductors positioned within the core and end turn conductors at the exit end shaped to follow the contour of the core, so that in operation a cylindrical magnetic field boundary is developed at the exit end of the core.

8. A deflection yoke for use with multi-beam cathode-ray tubes for minimizing dynamic misconvergence, the yoke comprising: a hollow ferromagnetic yoke core having a transverse cylindrical contour at the beam exit end thereof; and a yoke coil having longitudinal conductors positioned within the core and end turn conductors at the exit end shaped to follow the contour of the core, so that in operation a cylindrical magnetic field boundary is developed at the exit end of the core.

9. A deflection yoke for use with multi-beam cathode-ray tubes for minimizing dynamic misconvergence, the yoke comprising: a hollow circular cylindrical yoke core having a perpendicular transverse cylindrical contour at the beam exit end thereof; and a yoke coil having longitudinal conductors positioned within the core and end turn conductors at the exit end shaped to follow said contour of the core, so that in operation a concave magnetic field boundary is developed at the exit end of the core.

References Cited in the file of this patent

UNITED STATES PATENTS

| | | |
|---|---|---|
| 2,255,039 | Gunther | Sept. 9, 1941 |
| 2,570,425 | Bocciarelli | Oct. 9, 1951 |
| 2,817,782 | Over et al. | Dec. 24, 1957 |
| 3,007,087 | Corpew | Oct. 31, 1961 |

OTHER REFERENCES

Martin: Tele-Tech and Electronics Industries, December 1954, pages 82, 83, 140 and 141.